(12) United States Patent
Tanaka et al.

(10) Patent No.: US 11,661,540 B2
(45) Date of Patent: May 30, 2023

(54) REFRIGERATION APPARATUS

(71) Applicant: DAIKIN INDUSTRIES, LTD., Osaka (JP)

(72) Inventors: Masaru Tanaka, Osaka (JP); Shigeharu Taira, Osaka (JP); Tomoyuki Haikawa, Osaka (JP); Yoshiki Shimizu, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/091,562

(22) Filed: Nov. 6, 2020

(65) Prior Publication Data

US 2021/0055022 A1 Feb. 25, 2021

Related U.S. Application Data

(62) Division of application No. 16/073,412, filed as application No. PCT/JP2017/002800 on Jan. 26, 2017, now abandoned.

(30) Foreign Application Priority Data

Jan. 29, 2016 (JP) ................ 2016-016586

(51) Int. Cl.
*C09K 5/04* (2006.01)
*F25B 39/04* (2006.01)
(Continued)

(52) U.S. Cl.
CPC ............... *C09K 5/045* (2013.01); *F25B 1/00* (2013.01); *F25B 1/005* (2013.01); *F25B 39/04* (2013.01);
(Continued)

(58) Field of Classification Search
CPC .......... F25B 41/043; F25B 43/00; F25B 1/00; F25B 41/04; F25B 39/04; C09K 5/045; C09K 2205/126; F28F 1/02
See application file for complete search history.

(56) References Cited

U.S. PATENT DOCUMENTS

2011/0041547 A1 2/2011 Komatsu
2012/0143528 A1 6/2012 Kates
(Continued)

FOREIGN PATENT DOCUMENTS

CN 1664470 A 9/2005
CN 104047649 A 9/2014
(Continued)

OTHER PUBLICATIONS

Extended European Search Report for European Application No. 21162011.7, dated Jul. 9, 2021.
(Continued)

*Primary Examiner* — Lionel Nouketcha
(74) *Attorney, Agent, or Firm* — Birch, Stewart, Kolasch & Birch, LLP

(57) ABSTRACT

A refrigeration apparatus pertaining to the invention can suppress clogging due to polymers formed by the polymerization of refrigerant and improve safety. The refrigeration apparatus is equipped with a refrigeration cycle in which a compressor, a condenser, an expansion mechanism, and an evaporator are connected in a loop. The refrigeration apparatus is equipped with a polymer catcher. The polymer catcher is attached to piping interconnecting an outlet side of the compressor and an inlet side of the condenser and catches polymers of refrigerant circulating in the refrigeration cycle. The refrigerant includes a compound represented by a molecular formula having one or more carbon-carbon unsaturated bonds.

4 Claims, 4 Drawing Sheets

(51) Int. Cl.
  *F28F 1/02* (2006.01)
  *F25B 43/00* (2006.01)
  *F25B 1/00* (2006.01)

(52) U.S. Cl.
  CPC ............ *F25B 43/00* (2013.01); *F28F 1/02* (2013.01); *C09K 2205/126* (2013.01)

(56) References Cited

U.S. PATENT DOCUMENTS

| | | | |
|---|---|---|---|
| 2013/0008006 A1* | 1/2013 | Israel | B01D 39/1615 29/428 |
| 2014/0070132 A1 | 3/2014 | Fukushima | |
| 2014/0123696 A1 | 5/2014 | Kim et al. | |
| 2014/0260252 A1 | 9/2014 | Zyhowski et al. | |
| 2015/0007605 A1* | 1/2015 | Masui | F25B 39/00 62/508 |
| 2015/0369528 A1 | 12/2015 | Lee et al. | |
| 2016/0200955 A1 | 7/2016 | Ueda et al. | |

FOREIGN PATENT DOCUMENTS

| | | | | |
|---|---|---|---|---|
| EP | 2562490 A1 * | 2/2013 | | C09K 5/045 |
| EP | 3012555 A1 | 4/2016 | | |
| GB | 2411712 A | 9/2005 | | |
| JP | H06-159866 A | 6/1994 | | |
| JP | H06159866 A * | 6/1994 | | |
| JP | 10-300286 A | 11/1998 | | |
| JP | 2003-181229 A | 7/2003 | | |
| JP | 2009-270727 A | 11/2009 | | |
| JP | 2015-007257 A | 1/2015 | | |
| WO | WO 2013/038706 A1 | 3/2013 | | |
| WO | WO-2013038706 A1 * | 3/2013 | | C10M 171/008 |
| WO | WO 2014/203355 A1 | 12/2014 | | |
| WO | WO 2015/060400 A1 | 4/2015 | | |

OTHER PUBLICATIONS

Extended European Search Report, dated Aug. 21, 2019, for European Application No. 17744340.5.
International Preliminary Report on Patentability and the Written Opinion of the International Searching Authority (Forms PCT/IB/338, PCT/IB/373 and PCT/ISA/237), dated Aug. 9, 2018 for International Application No. PCT/JP2017/002800.
International Search Report for PCT/JP2017/002800 (PCT/ISA/210) dated Apr. 18, 2017.
Written Opinion of the International Searching Authority for PCT/JP2017/002800 (PCT/ISA/237) dated Apr. 18, 2017.

* cited by examiner

REFRIGERATION APPARATUS

CROSS REFERENCE TO RELATED APPLICATIONS

This application is a Continuation of copending application Ser. No. 16/073,412, filed on Jul. 27, 2018, which is the National Phase under 35 U.S.C. § 371 of International Application No. PCT/JP2017/002800, filed on Jan. 26, 2017, which claims the benefit under 35 U.S.C. § 119(a) to Patent Application No. 2016-016586, filed in Japan on Jan. 29, 2016, all of which are hereby expressly incorporated by reference into the present application.

TECHNICAL FIELD

The present invention relates to a refrigeration apparatus.

BACKGROUND ART

In recent years, hydrofluoroolefins (HFOs) have been used as refrigerant in refrigeration apparatuses such as air conditioning apparatuses, as disclosed in patent document 1 (JP-A No. 2015-007257). Examples of HFOs include 1,1,2-trifluoroethylene (HFO-1123) and 2,3,3,3-tetrafluoropropene (HFO-1234yf). HFOs have a low global warming potential because they are easily decomposed by OH radicals in the atmosphere.

SUMMARY OF INVENTION

Technical Problem

However, there are HFOs that have low thermal stability and easily undergo disproportionation. Disproportionation is a chemical reaction in which two or more molecules of the same type react with each other, for example, to form two or more different types of substances. In a case where the refrigerant is a compound represented by a molecular formula having one or more carbon-carbon unsaturated bonds, such as HFO-1123, polymerization, which is a type of disproportionation, easily progresses under a high temperature and a high pressure. Polymerization is a reaction in which plural monomers combine to form a compound (macromolecular compound) with a large molecular weight. Polymers, which are compounds formed by polymerization, typically have a molecular weight of 10,000 or more.

In a refrigeration apparatus, polymerization of the refrigerant easily progresses inside the compression mechanism of the compressor. There is the concern that if the polymers formed by the polymerization of the refrigerant stick to the piping of the refrigeration apparatus, for example, the refrigerant flow passage will become clogged with the polymers. If the piping of the refrigeration apparatus, for example, becomes clogged with the polymers, there is the risk that the neighborhood around the clogged section will reach a high temperature and a high pressure and explode.

It is an object of the present invention to provide a refrigeration apparatus that suppresses clogging due to polymers formed by the polymerization of refrigerant and is highly safe.

Solution to Problem

A refrigeration apparatus pertaining to a first aspect of the invention is equipped with a refrigeration cycle in which a compressor, a condenser, an expansion mechanism, and an evaporator are connected in a loop. The refrigeration apparatus is equipped with a polymer catcher. The polymer catcher is attached to piping interconnecting an outlet side of the compressor and an inlet side of the condenser and catches polymers of refrigerant circulating in the refrigeration cycle. The refrigerant includes a compound represented by a molecular formula having one or more carbon-carbon unsaturated bonds.

The refrigeration apparatus pertaining to the first aspect is equipped with the polymer catcher for catching the polymers formed by the polymerization of the refrigerant molecules circulating in the refrigeration cycle. In the compressor of the refrigeration apparatus, the polymerization of the refrigerant molecules easily progresses due to high temperature and high pressure. For that reason, by providing the polymer catcher between the compressor and the condenser of the refrigeration cycle, the polymers that have been formed are efficiently caught. Consequently, the refrigeration apparatus pertaining to the first aspect can suppress clogging due to the polymers formed by the polymerization of the refrigerant and improve safety.

A refrigeration apparatus pertaining to a second aspect of the invention is the refrigeration apparatus pertaining to the first aspect and is further equipped with a four-way switching valve. The four-way switching valve is attached to the piping. The polymer catcher is attached between the outlet side of the compressor and an inlet side of the four-way switching valve.

The refrigeration apparatus pertaining to the second aspect is equipped with the four-way switching valve. The four-way switching valve has sliding portions that the polymers formed by the polymerization of the refrigerant molecules are likely to clog up. For that reason, in a case where the refrigeration apparatus is equipped with the four-way switching valve, clogging due to the polymers is effectively suppressed by providing the polymer catcher between the compressor and the four-way switching valve. Consequently, the refrigeration apparatus pertaining to the second aspect can suppress clogging due to the polymers formed by the polymerization of the refrigerant and improve safety.

A refrigeration apparatus pertaining to a third aspect of the invention is the refrigeration apparatus pertaining to the first aspect or the second aspect, wherein the polymer catcher is a filter that suppresses passage of the polymers.

The refrigeration apparatus pertaining to the third aspect is equipped with the filter that is a polymer catcher for physically catching the polymers.

A refrigeration apparatus pertaining to a fourth aspect of the invention is the refrigeration apparatus pertaining to any one of the first to third aspects, wherein the polymer catcher is a dryer that has an adsorbent that adsorbs the polymers.

The refrigeration apparatus pertaining to the fourth aspect is equipped with the dryer that is a polymer catcher for chemically catching the polymers.

A refrigeration apparatus pertaining to a fifth aspect of the invention is the refrigeration apparatus pertaining to the fourth aspect, wherein the dryer further has a stabilizer and an antioxidant.

The refrigeration apparatus pertaining to the fifth aspect is equipped with the dryer that has the stabilizer and the antioxidant. The stabilizer is a deoxidizer, for example. Acceleration of the polymerization caused by oxygen is suppressed by the stabilizer and the antioxidant. Consequently, the refrigeration apparatus pertaining to the fifth aspect can suppress clogging due to the polymers formed by the polymerization of the refrigerant and improve safety.

A refrigeration apparatus pertaining to a sixth aspect of the invention is the refrigeration apparatus pertaining to any one of the first to fifth aspects, wherein the condenser has multi-hole flat tubes through which the refrigerant flows.

The refrigeration apparatus pertaining to the sixth aspect can suppress clogging of the multi-hole flat tubes due to the polymers formed by the polymerization of the refrigerant and improve safety.

Advantageous Effects of Invention

The refrigeration apparatus pertaining to the first to sixth aspects of the invention can suppress clogging due to polymers formed by the polymerization of refrigerant and improve safety.

DESCRIPTION OF EMBODIMENT (1) Configuration of Air Conditioning Apparatus

Figure 1:
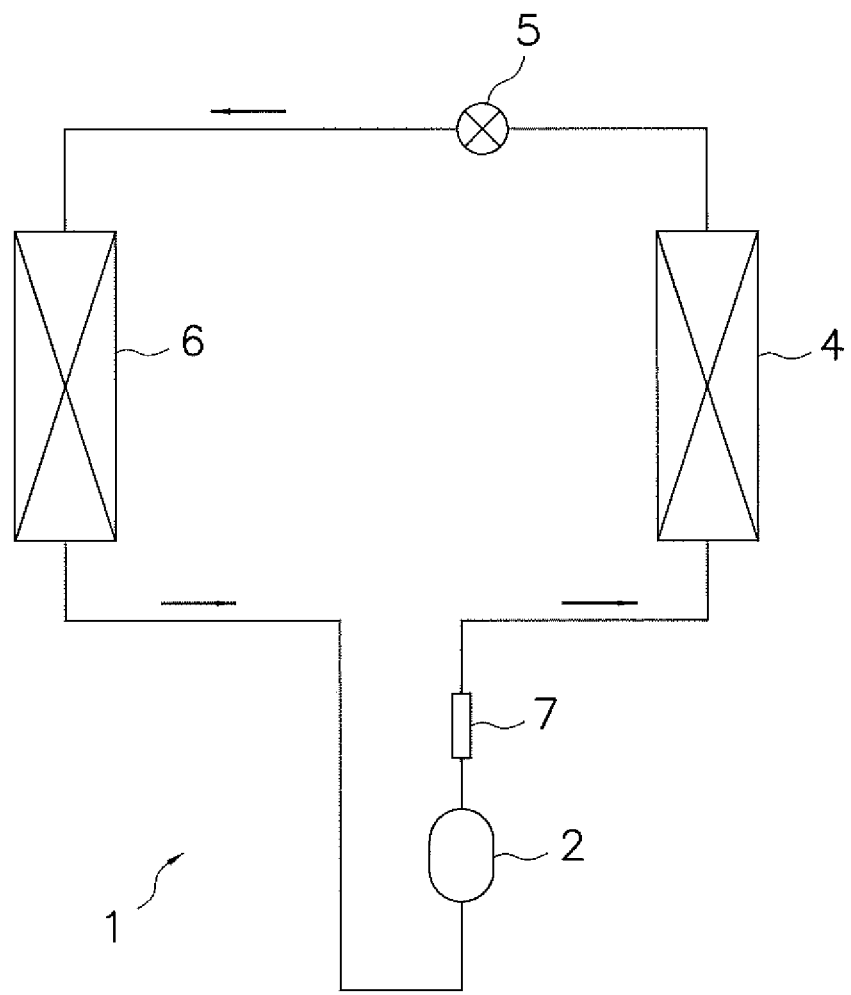
FIG. 1 is a refrigerant circuit diagram of an air conditioning apparatus pertaining to an embodiment of the invention.

An air conditioning apparatus 1 serving as a refrigeration apparatus pertaining to an embodiment of the invention will be described. FIG. 1 is a refrigerant circuit diagram of the air conditioning apparatus 1. The air conditioning apparatus 1 is equipped with a refrigeration cycle in which a compressor 2, a catching mechanism 7, an outdoor heat exchanger 4, an expansion mechanism 5, and an indoor heat exchanger 6 are connected in a loop. The air conditioning apparatus 1 is a dedicated cooling apparatus that can perform just a cooling operation. In FIG. 1, the solid arrows indicate the flow direction of the refrigerant circulating in the refrigeration cycle when the air conditioning apparatus 1 is in operation.

The refrigeration cycle of the air conditioning apparatus 1 that performs the cooling operation will be described. First, the compressor 2 compresses low-pressure gas refrigerant and discharges high-pressure gas refrigerant. The compressed refrigerant that has been discharged from the compressor 2 passes through the catching mechanism 7. In the catching mechanism 7, polymers mixed with the compressed refrigerant are caught. Details about the polymers will be described later. The compressed refrigerant that has passed through the catching mechanism 7 is supplied to the outdoor heat exchanger 4. The outdoor heat exchanger 4 condenses the high-pressure gas refrigerant and discharges high-pressure liquid refrigerant. The outdoor heat exchanger 4 is, for example, a heat exchanger that has multi-hole flat tubes. The refrigerant that has been discharged from the outdoor heat exchanger 4 passes through the expansion mechanism 5 and becomes low-pressure refrigerant in a gas-liquid mixed state. The expansion mechanism 5 is, for example, a capillary tube. The refrigerant that has passed through the expansion mechanism 5 is supplied to the indoor heat exchanger 6. The indoor heat exchanger 6 evaporates the low-pressure refrigerant in the gas-liquid mixed state and discharges low-pressure gas refrigerant. The refrigerant that has been discharged from the indoor heat exchanger 6 is supplied to the compressor 2.

The air conditioning apparatus 1 is a dedicated cooling apparatus, the outdoor heat exchanger 4 functions as a condenser, and the indoor heat exchanger 6 functions as an evaporator. For that reason, a room is cooled by the latent heat of evaporation of the refrigerant generated in the indoor heat exchanger 6.

A refrigerating machine oil is included in the refrigeration cycle of the air conditioning apparatus 1. The refrigerating machine oil is mainly a lubricating oil used to prevent wear and seizure of sliding portions of the compressor 2. The sliding portions of the compressor 2 include, for example, thrust sliding surfaces between two scrolls and sliding surfaces between a crankshaft and a bearing in a case where the compressor 2 is a scroll compressor.

The refrigerant circulating in the refrigerant circuit of the air conditioning apparatus 1 includes a compound represented by a molecular formula having one or more carbon-carbon unsaturated bonds. For example, a hydrofluoroolefin (HFO) is used as the refrigerant. Examples of the HFO include 1,1,2-trifluoroethylene (HFO-1123) and 2,3,3,3-tetrafluoropropene (HFO-1234yf and HFO-1234ze(E), etc.). HFOs have a low global warming potential because they are easily decomposed by OH radicals in the atmosphere.

Furthermore, the refrigerant used in the air conditioning apparatus 1 may also be a mixed refrigerant. In that case, the mixed refrigerant includes a compound represented by a molecular formula having one or more carbon-carbon unsaturated bonds. For example, the refrigerant used in the air conditioning apparatus 1 may be a mixed refrigerant including a HFC and a HFO. Specifically, the mixed refrigerant may include R32 represented by molecular formula $CH_2F_2$ as the HFC and include HFO-1234yf and HFO-1234ze(E) as the HFO. HFCs do not include chlorine, so they do not destroy the ozone layer as much as chlorofluorocarbons and hydrochlorofluorocarbons.

(2) Configuration of Catching Mechanism

In the air conditioning apparatus 1, the catching mechanism 7 is attached to piping between a discharge port (outlet side) of the compressor 2 and an inflow port (inlet side) of the outdoor heat exchanger 4. The catching mechanism 7 has a configuration where the refrigerant that has been compressed by the compressor 2 passes through the inside of the catching mechanism 7. It is preferred that the catching mechanism 7 have a structure that allows the catching mechanism 7 to be easily attached to the piping of the air conditioning apparatus 1 and easily detached from the piping of the air conditioning apparatus 1. In this case, replacement of the catching mechanism 7 can be easily performed.

Figure 2:
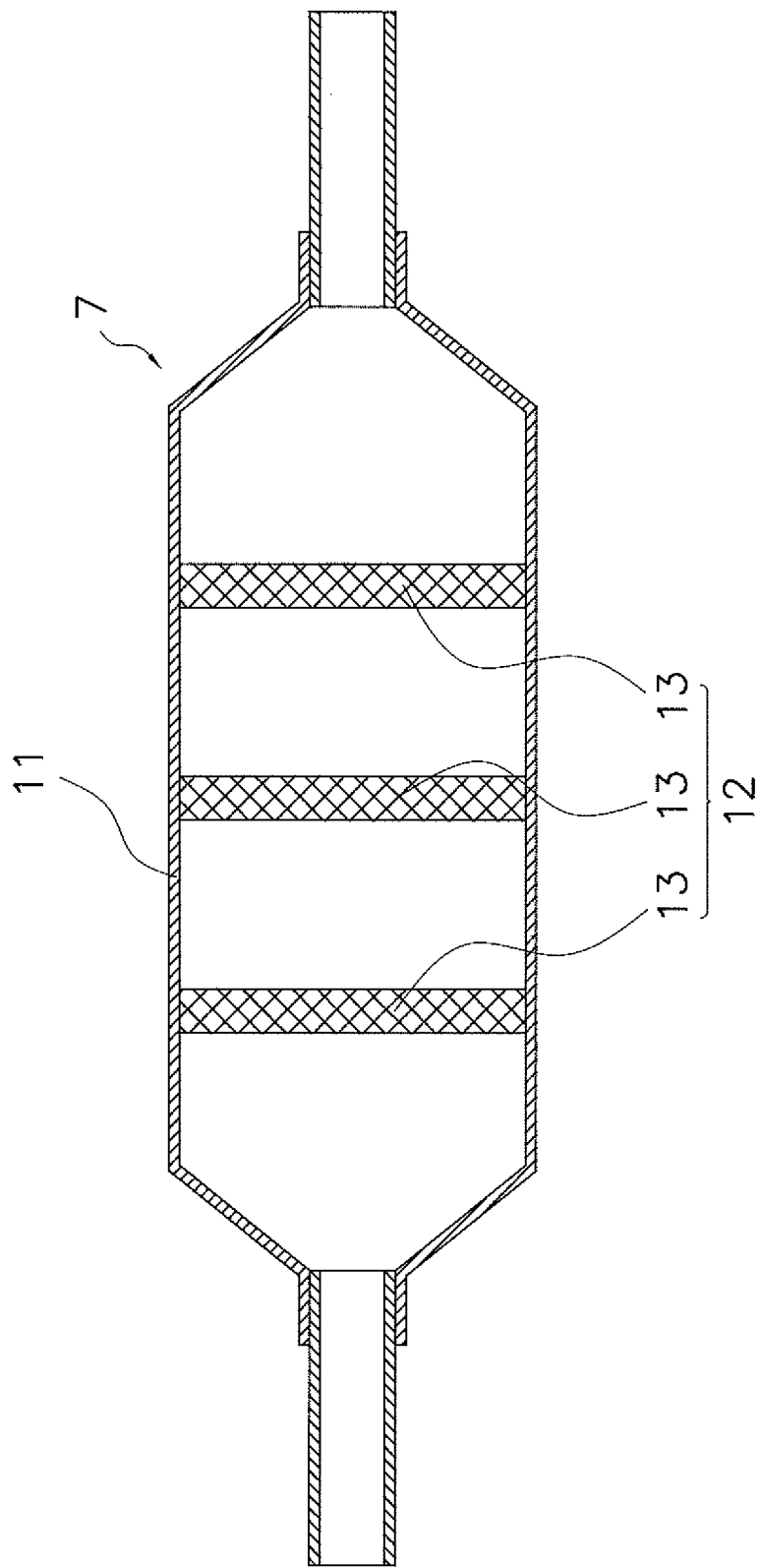
FIG. 2 is a sectional view of a catching mechanism.

FIG. 2 is a sectional view of an example of the catching mechanism 7. The catching mechanism 7 mainly has a body portion 11 and a filter portion 12. The body portion 11 is a tubular member having a portion whose diameter is larger than that of the piping of the air conditioning apparatus 1 (the piping preceding and following the catching mechanism 7). The filter portion 12 is a porous member secured to the inner peripheral surface of the body portion 11. The filter portion 12 is a member that catches polymers formed by polymerization of the molecules of the refrigerant. The refrigerant that passes through the inside of the catching mechanism 7 passes through the filter portion 12. At that time, the polymers mixed with the refrigerant are caught by the filter portion 12.

The filter portion 12 is, for example, configured from metal meshes 13 formed of SUS or the like. The meshes 13 are net-like members to which the polymers passing together with the refrigerant through the inside of the catching mechanism 7 physically stick. The wire diameter and aperture size of the meshes 13 are arbitrary. The wire diameter of the meshes 13 is the thickness of the wires configuring the meshes 13. The aperture size of the meshes 13 is the inner dimension of the holes in the meshes 13. In a case where the meshes 13 are a plain weave (a configuration where the wires are woven in the form of a grid), the aperture size is equal to the length of one side of the square holes in the meshes 13. It suffices for the aperture size of the meshes 13 to be about several mm. However, in a case where the aperture size of the meshes 13 is equal to or less than 1 mm, the apertures become likely to become plugged with the polymers. If the apertures in the meshes 13 become plugged with the polymers, there is the potential for the catching mechanism 7 to become clogged with the polymers and for the refrigerant to become unable to smoothly pass through the catching mechanism 7, so that the operating efficiency and safety of the air conditioning apparatus 1 are reduced. Furthermore, if the aperture size of the meshes 13 is too large, the polymers become unlikely to contact the meshes 13 and the ability to catch the polymers is reduced. For that reason, it is preferred that the aperture size of the meshes 13 be large enough so that the apertures in the meshes 13 are unlikely to become plugged with the polymers and small enough so that the polymers are adequately caught.

It will be noted that the number of meshes 13 in the filter portion 12 of the catching mechanism 7 is arbitrary. For example, as shown in FIG. 2, plural meshes 13 may be attached a predetermined interval apart from each other to the inside of the body portion 11. Furthermore, in a case where the filter portion 12 includes plural meshes 13, the meshes 13 may have mutually different wire diameters and aperture sizes. For example, the aperture sizes of the meshes 13 may become gradually smaller heading from the upstream side to the downstream side of the catching mechanism 7.

(3) Composition of Refrigerating Machine Oil

Next, the composition of the refrigerating machine oil included in the refrigeration cycle will be described. The refrigerating machine oil mainly comprises a base oil, an acid scavenger, an extreme-pressure agent, and an antioxidant.

For the base oil, a mineral oil or a synthetic oil is used. A base oil having good compatibility with the refrigerant used in the air conditioning apparatus 1 is appropriately chosen. Examples of the mineral oil include naphthenic mineral oils and paraffinic mineral oils. Examples of the synthetic oil include ester compounds, ether compounds, poly-α-olefins, and alkylbenzenes. Specific examples of the synthetic oil include polyvinyl ethers, polyol esters, and polyalkylene glycols. It will be noted that a mixture comprising a combination of two or more types of the above mineral oils or synthetic oils may also be used as the base oil.

The acid scavenger is an additive used to react with acids such as hydrofluoric acid formed by the decomposition of the refrigerant to thereby suppress deterioration of the refrigerating machine oil caused by the acids. Examples of the acid scavenger include epoxy compounds, carbodiimide compounds, and terpene compounds. Specific examples of the acid scavenger include 2-ethylhexyl glycidyl ether, phenyl glycidyl ether, epoxidized cyclohexyl carbinol, di(alkylphenyl)carbodiimide, and β-pinene. The acids such as hydrofluoric acid formed by the decomposition of the refrigerant are captured by the acid scavenger included in the refrigerating machine oil. Because of this, deterioration of the refrigerating machine oil caused by the acids formed by the decomposition of the refrigerant, and corrosion of metal parts of the air conditioning apparatus 1, are suppressed.

The extreme-pressure agent is an additive used to prevent wear and seizure of sliding portions of the compressor 2. The refrigerating machine oil prevents contact between sliding members by forming an oil film between member surfaces that slide against each other at the sliding portions. However, in the case of using a low-viscosity refrigerating machine oil such as polyvinyl ether and in a case where the pressure exerted on the sliding members is high, the sliding members become likely to contact each other. An extreme-pressure agent reacts with the member surfaces that slide against each other at the sliding portions and forms a coating to thereby suppress the occurrence of wear and seizure. Examples of extreme-pressure agents include phosphoric acid esters, phosphorous acid esters, thiophosphates, sulfurized esters, sulfides, and thio bisphenols. Specific examples of extreme-pressure agents include tricresyl phosphate (TCP), triphenyl phosphate (TPP), triphenyl phosphorothioate (TPPT), amines, C11-14 side chain alkyl, and monohexyl and dihexyl phosphates. TCP is adsorbed on the surfaces of the sliding members and decomposes to form a phosphate coating.

The antioxidant is an additive used to prevent oxidation of the refrigerating machine oil. Specific examples of the antioxidant include zinc dithiophosphate, organic sulfur compounds, phenol antioxidants such as 2,6-di-tert-butyl-4-methylphenol, 2,6-di-tert-butyl-4-ethylphenol, and 2,2'-methylenebis(4-methyl-6-tert-butylphenol), amine antioxidants such as phenyl-α-naphthylamine and N,N'-di-phenyl-p-phenylenediamine, and N,N'-disalicylidene-1,2-diaminopropane.

(4) Characteristics

The air conditioning apparatus 1 is equipped with the catching mechanism 7 for catching the polymers formed by the polymerization of the refrigerant molecules. The compressor 2 of the air conditioning apparatus 1 is a constituent element in which the polymerization of the refrigerant molecules easily progresses because the inside of the compressor 2 reaches a high temperature and a high pressure. The polymers formed by the polymerization of the refrigerant molecules are solid, and there is the concern that if they stick to the piping of the refrigeration cycle, the refrigerant flow passage will become clogged with the polymers. There is the concern that if the refrigerant flow passage of the air conditioning apparatus 1 becomes clogged with the polymers, the flow of the refrigerant in the refrigeration cycle will be obstructed and that the refrigerant will become compressed on the upstream side of the section clogged with the polymers. As a result, there is the risk that part of the refrigeration cycle will reach a high temperature and a high pressure and explode. Furthermore, there is the concern that if the polymers formed by the polymerization of the refrigerant get caught in the sliding portions of the air conditioning apparatus 1 (e.g., the compression mechanism of the compressor 2), the sliding portions will sustain damage and that the safety and performance of the air conditioning apparatus 1 will be reduced. For that reason, there is the concern that if the air conditioning apparatus 1 is operated for a long time, the operating efficiency and safety of the air conditioning apparatus 1 will be reduced by the polymers formed by the polymerization of the refrigerant molecules. Particularly in a case where the refrigerant is a compound represented by a molecular formula having one or more carbon-carbon unsaturated bonds, such as HFO-1123, polymerization caused by heat easily progresses, so it is easy for problems caused by the polymers formed by the polymerization of the refrigerant to occur.

In the air conditioning apparatus 1, the catching mechanism 7 is attached to the piping between the compressor 2 and the outdoor heat exchanger 4 of the refrigeration cycle. The catching mechanism 7 is equipped with the filter portion 12 that catches the polymers mixed with the refrigerant passing through the inside of the catching mechanism 7. The filter portion 12 is configured from the plural meshes 13. The polymers passing through the catching mechanism 7 physically stick to the meshes 13. Because of this, when the refrigerant passes through the inside of the catching mechanism 7, the polymers formed by the polymerization of the refrigerant are caught and removed by the catching mechanism 7. Because of this, the refrigerant flow passage of the air conditioning apparatus 1 is suppressed from becoming clogged with the polymers, and the sliding portions are suppressed from getting caught in the sliding portions of the air conditioning apparatus 1. Furthermore, the meshes 13 are net-like members that virtually do not obstruct the flow of the refrigerant, so the quantity of the refrigerant flowing into the outdoor heat exchanger 4 is not greatly reduced by the catching mechanism 7. For that reason, the operating efficiency of the air conditioning apparatus 1 is not greatly reduced by the catching mechanism 7.

Consequently, the air conditioning apparatus 1 can suppress clogging due to the polymers formed by the polymerization of the refrigerant without lowering operating efficiency and improve safety.

Furthermore, the catching mechanism 7 is attached to the piping between the compressor 2 and the outdoor heat exchanger 4. For that reason, the catching mechanism 7 can have a structure that allows the catching mechanism 7 to be easily attached to the piping of the air conditioning apparatus 1 and easily detached from the piping of the air conditioning apparatus 1. In this case, replacement of the catching mechanism 7 can be easily performed, so maintenance work such as inspecting and repairing the air conditioning apparatus 1 can be efficiently carried out.

It will be noted that, in a case where the outdoor heat exchanger 4 is a heat exchanger that has multi-hole flat tubes, the diameter of the flow passages through which the refrigerant flows in the multi-hole flat tubes is small, so the polymers are likely to clog up the multi-hole flat tubes. For that reason, in order to prevent the multi-hole flat tubes from becoming clogged with the polymers, it is important to catch the polymers before the flow of the refrigerant with which the polymers are mixed flows into the multi-hole flat tubes of the outdoor heat exchanger 4. The air conditioning apparatus 1 can suppress, with the catching mechanism 7 attached between the compressor 2 and the outdoor heat exchanger 4, clogging of the multi-hole tubes due to the polymers and improve safety.

(5) Example Modifications

An embodiment of the invention has been described above, but the specific configurations of the invention can be changed in a range that does not depart from the spirit of the invention. Example modifications applicable to the embodiment of the invention will be described below.

(5-1) Example Modification A

Figure 3:
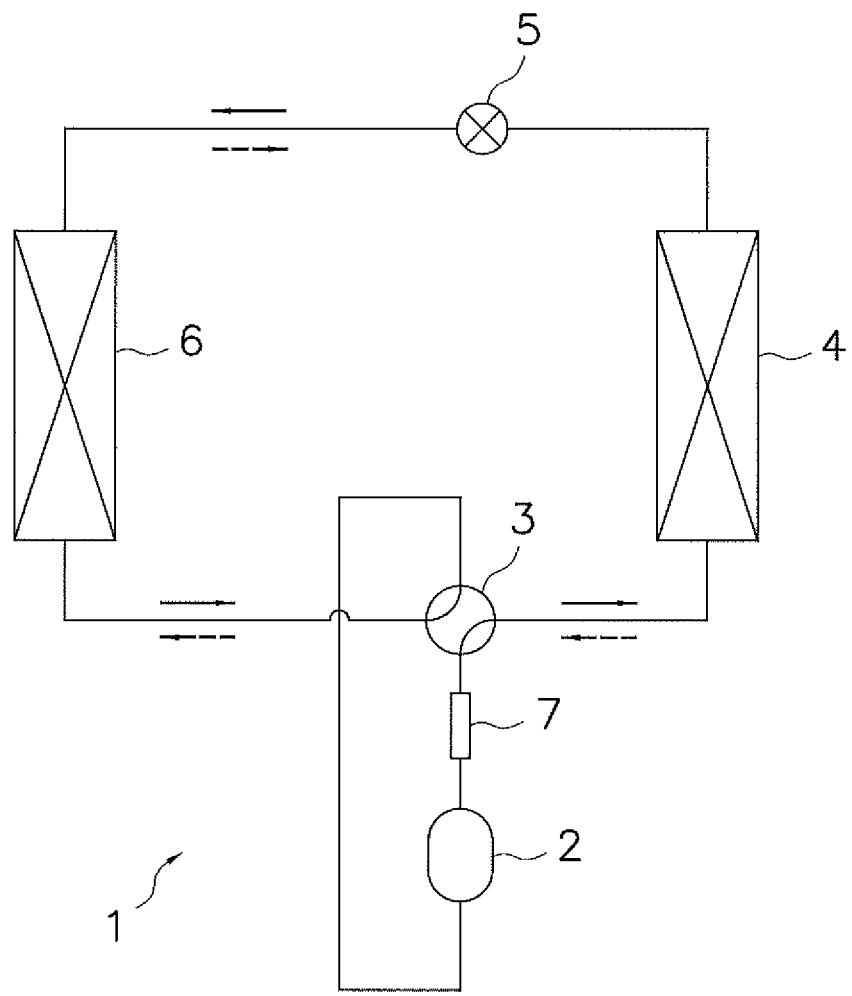
FIG. 3 is a refrigerant circuit diagram of the air conditioning apparatus pertaining to example modification A.

In the embodiment, the air conditioning apparatus 1 is a dedicated cooling apparatus. However, the air conditioning apparatus 1 may also be an apparatus equipped with both a cooling function and a heating function. FIG. 3 is a refrigerant circuit diagram of the air conditioning apparatus 1 in this example modification. The air conditioning apparatus 1 is mainly configured from a compressor 2, a catching mechanism 7, a four-way switching valve 3, an outdoor heat exchanger 4, an expansion mechanism 5, and an indoor heat exchanger 6. In FIG. 3, the solid arrows indicate the flow of the refrigerant during the cooling operation and the dashed arrows indicate the flow of the refrigerant during the heating operation.

During the cooling operation, the outdoor heat exchanger 4 functions as a condenser and the indoor heat exchanger 6 functions as an evaporator. That is, the room is cooled by the latent heat of evaporation of the refrigerant generated by the indoor heat exchanger 6. Conversely, during the heating operation, the four-way switching valve 3 is switched so that the outdoor heat exchanger 4 functions as an evaporator and the indoor heat exchanger 6 functions as a condenser. That is, the room is heated by the latent heat of condensation of the refrigerant generated by the indoor heat exchanger 6.

In this example modification, the catching mechanism 7 is attached to the piping between a discharge port (outlet side) of the compressor 2 and an inflow port (inlet side) of the four-way switching valve 3. The catching mechanism 7 is the same as the one in the embodiment. The four-way switching valve 3 has sliding portions in which the polymers formed by the polymerization of the refrigerant molecules are likely to get caught and clog. If the polymers clog in the four-way switching valve 3, there is the concern that the switching of the four-way switching valve 3 will not be normally carried out, and there is also the concern that the sliding portions of the four-way switching valve 3 will sustain damage. Therefore, in a case where the air conditioning apparatus 1 is equipped with the four-way switching valve 3, the polymers are suppressed from entering the four-way switching valve 3 by attaching the catching mechanism 7 to the piping between the compressor 2 and the four-way switching valve 3. Because of this, clogging of the four-way switching valve 3 due to the polymers is effectively suppressed. Consequently, the air conditioning apparatus 1 of this example modification can suppress clogging due to the polymers formed by the polymerization of the refrigerant and improve safety.

(5-2) Example Modification B

In the embodiment, the filter portion 12 of the catching mechanism 7 is configured from the meshes 13. However, the filter portion 12 may also include a porous member other than the meshes 13. For example, the filter portion 12 may also include a fibrous filter.

Figure 4:
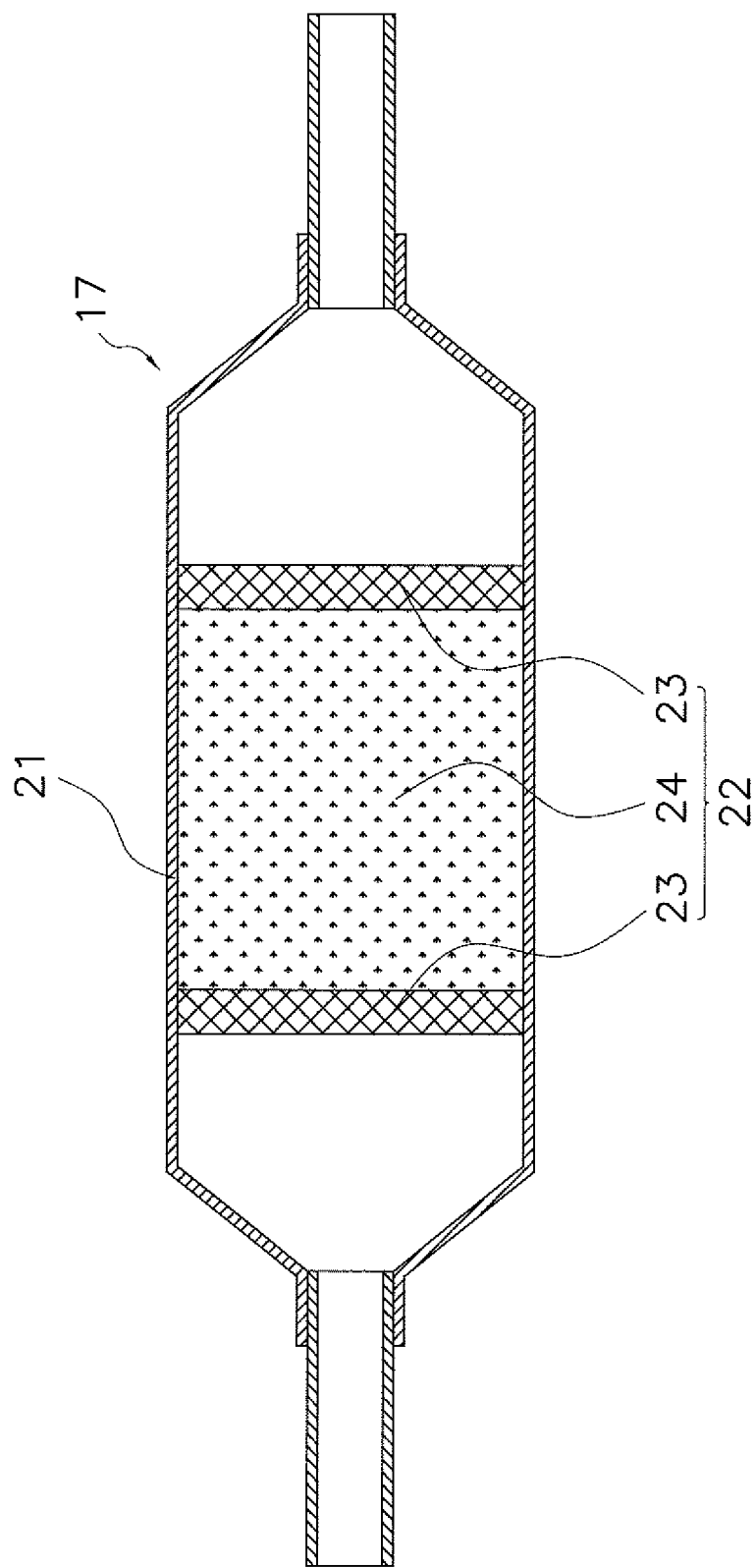
FIG. 4 is a sectional view of a catching mechanism pertaining to example modification B.

FIG. 4 is a sectional view of an example of a catching mechanism 17 pertaining to this example modification. The catching mechanism 17 mainly has a body portion 21 and a filter portion 22. The filter portion 22, as shown in FIG. 4, has a pair of meshes 23 and a fibrous filter 24. The pair of meshes 23 are secured to the body portion 21. The fibrous filter 24 is sandwiched from both sides and supported by the pair of meshes 23.

The material of the fibrous filter is arbitrary. Examples of the material of the fibrous filter include resins such as polypropylene, polyethylene, polyethylene terephthalate, and nylon, metal wool such as copper, and glass wool. In particular, glass wool is suitable as the material of the fibrous filter because of its high ability to catch the polymers.

(5-3) Example Modifications C

In the embodiment, the filter portion 12 of the catching mechanism 7 is configured from the meshes 13. However, punched metal may also be used instead of the meshes 13. Punched metal is a member where numerous holes are formed in a thin metal plate. The hole diameter of the punched metal is arbitrary, but preferably it is large enough so that the holes in the punched metal are unlikely to become plugged with the polymers and small enough so that the polymers are adequately caught.

(5-4) Example Modification D

In the embodiment, the catching mechanism 7 is equipped with the filter portion 12 that physically catches the polymers included in the refrigerant. However, the catching mechanism 7 may also be equipped with a dryer that chemically catches the polymers included in the refrigerant. For example, the catching mechanism 7 may also be an adsorption dryer. In this case, the catching mechanism 7 has, inside, an adsorbent that adsorbs the polymers. The polymers mixed with the refrigerant passing through the catching mechanism 7 are adsorbed and caught by the adsorbent.

Furthermore, in this example modification, in a case where the catching mechanism 7 is an adsorption dryer, the catching mechanism 7 may further have a stabilizer and an antioxidant in addition to the adsorbent. The stabilizer is a deoxidizer, for example. Acceleration of the polymerization of the refrigerant molecules is suppressed by the stabilizer and the antioxidant. Consequently, the catching mechanism 7 can suppress the formation of polymers resulting from the polymerization of the refrigerant, so the catching mechanism 7 can more effectively suppress clogging due to the polymers.

Furthermore, there is the concern that if the adsorbent is exposed to high-temperature refrigerant gas, the adsorbent will transmute or decompose, resulting in a reduced ability to adsorb the polymers. Furthermore, there is the concern that if the stabilizer and the antioxidant are exposed to high-temperature refrigerant gas, the stabilizer and the antioxidant will transmute or decompose, resulting in a reduced effect of suppressing polymerization. However, the catching mechanism 7 is attached to the piping between the compressor 2 and the outdoor heat exchanger 4. For that reason, high-temperature refrigerant gas just after compression by the compressor 2 does not pass through the catching mechanism 7. That is, refrigerant gas that has been discharged from the compressor 2 and has been cooled while flowing through the piping passes through the catching mechanism 7. Consequently, by attaching the catching mechanism 7 to the piping between the compressor 2 and the outdoor heat exchanger 4, the occurrence of trouble in which the effect of suppressing clogging due to polymers is reduced by high-temperature refrigerant gas is prevented.

Furthermore, it is preferred that the stabilizer and the antioxidant be provided on the upstream side (the side nearer to the compressor 2) of the adsorbent inside the catching mechanism 7. That is, it is preferred that the refrigerant gas first contact the stabilizer and the antioxidant and then contact the adsorbent inside the catching mechanism 7. The stabilizer and the antioxidant have the effect of suppressing the formation of polymers, so the quantity of polymers contacting the adsorbent is reduced by the above configuration. Consequently, a reduction in the adsorption ability of the adsorbent caused by the adsorption of the polymers is suppressed, so the life of the catching mechanism 7 is extended.

Furthermore, in this example modification, a polymer suppression mechanism having a stabilizer and an antioxidant inside may also be attached to the piping between the compressor 2 and the outdoor heat exchanger 4 separately from the catching mechanism 7 that has just an adsorbent and functions as a dryer. In this case, the catching mechanism 7 and the polymer suppression mechanism are mutually independent members. For that reason, during the work of maintaining the air conditioning apparatus 1, just the catching mechanism 7 can be replaced and just the polymer suppression mechanism can be replaced.

(5-5) Example Modification E

In example modification A, the air conditioning apparatus 1 is equipped with the four-way switching valve 3. However, the air conditioning apparatus 1 may also be equipped with a bridge circuit instead of the four-way switching valve 3. The four-way switching valve 3 has sliding portions, so there is the concern that the polymerization of the refrigerant molecules will be accelerated by frictional heat in the sliding portions. For that reason, by employing a bridge circuit that does not have sliding portions instead of the four-way switching valve 3 in the air conditioning apparatus 1, the formation of polymers by the polymerization of the refrigerant is suppressed and clogging due to the polymers is more effectively suppressed.

(5-6) Example Modification F

In the embodiment, the expansion mechanism 5 of the air conditioning apparatus 1 is, for example, a capillary tube. However, the expansion mechanism 5 may also be an electrically powered valve rather than a capillary tube. The inner diameter of a capillary tube is small, so there is the concern that the polymers will be likely to clog up the capillary tube. For that reason, by employing an electrically powered valve whose refrigerant flow passage area is larger instead of a capillary tube, clogging due to the polymers is more effectively suppressed.

INDUSTRIAL APPLICABILITY

The refrigeration apparatus pertaining to the invention can suppress clogging due to polymers formed by the polymerization of refrigerant and improve safety.

REFERENCE SIGNS LIST

1 Air conditioning apparatus (Refrigeration apparatus)
2 Compressor
4 Outdoor Heat Exchanger (Condenser, Evaporator)
5 Expansion Mechanism
6 Indoor Heat Exchanger (Evaporator, Condenser)
7 Catching Mechanism (Polymer Catcher)

CITATION LIST

Patent Literature

Patent Document 1: JP-A No. 2015-007257

The invention claimed is:
1. A refrigeration apparatus, comprising:
a compressor,
a condenser,
an expansion mechanism including a capillary tube or an electrically powered valve,
an evaporator,
wherein the compressor, the condenser, and the expansion mechanism are connected in a loop, and
a polymer catcher disposed in an intermediate position between the compressor and the condenser and is directly and mechanically attached to piping interconnecting an outlet side of the compressor and an inlet side of the condenser and chemically catches polymers of refrigerant circulating in the refrigeration cycle,
wherein the refrigerant includes a compound represented by a molecular formula having one or more carbon-carbon unsaturated bonds,
the polymer catcher is a dryer that has an adsorbent that adsorbs the polymers, and the condenser has multi-hole flat tubes through which the refrigerant flows.

2. The refrigeration apparatus according to claim 1, further comprising a four-way switching valve that is attached to the piping, wherein the polymer catcher is attached between the outlet side of the compressor and an inlet side of the four-way switching valve.

3. The refrigeration apparatus according to claim 1, wherein the dryer further has a stabilizer and an antioxidant.

4. The refrigeration apparatus according to claim 2, wherein the dryer further has a stabilizer and an antioxidant.

* * * * *